US012580005B2

(12) United States Patent (10) Patent No.: US 12,580,005 B2
Nishida (45) Date of Patent: Mar. 17, 2026

(54) MAGNETIC TAPE CARTRIDGE AND MANUFACTURING METHOD OF MAGNETIC TAPE CARTRIDGE

(71) Applicant: FUJIFILM CORPORATION, Tokyo (JP)

(72) Inventor: Kenji Nishida, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 147 days.

(21) Appl. No.: 18/443,315

(22) Filed: Feb. 16, 2024

(65) Prior Publication Data

US 2024/0290361 A1 Aug. 29, 2024

(30) Foreign Application Priority Data

Feb. 27, 2023 (JP) ................................. 2023-028963

(51) Int. Cl.
*G11B 33/04* (2006.01)
*G11B 23/04* (2006.01)
*G11B 23/107* (2006.01)

(52) U.S. Cl.
CPC ............ *G11B 33/04* (2013.01); *G11B 23/107* (2013.01); *G11B 23/042* (2013.01)

(58) Field of Classification Search
CPC ...... G11B 33/04; G11B 23/107; G11B 23/042
See application file for complete search history.

(56) References Cited

U.S. PATENT DOCUMENTS

| | | | |
|---|---|---|---|
| 6,452,745 B1 * | 9/2002 | Shiga ................... | G11B 23/042 |
| 2021/0217441 A1 * | 7/2021 | Nakashio ........... | G11B 5/00813 |
| 2021/0295870 A1 | 9/2021 | Sumiya | |
| 2021/0304795 A1 * | 9/2021 | Sumiya ................ | G11B 23/107 |

FOREIGN PATENT DOCUMENTS

| | | |
|---|---|---|
| JP | H11-306720 A | 11/1999 |
| JP | 2006-323918 A | 11/2006 |
| JP | 2021-150000 A | 9/2021 |

* cited by examiner

*Primary Examiner* — Daniell L Negron
*Assistant Examiner* — Michelle J. Kim
(74) *Attorney, Agent, or Firm* — SOLARIS Intellectual Property Group, PLLC

(57) ABSTRACT

A magnetic tape cartridge includes a noncontact communication medium that is provided in a case and in which a through-hole penetrating a substrate in a plate thickness direction is formed, a member having one end provided in the case, a shaft portion that is capable of positioning the noncontact communication medium in the case by being inserted into the through-hole, and a restriction portion that is provided at the other end of the member and that is configured to restrict displacement of the noncontact communication medium in a direction in which the noncontact communication medium comes off the shaft portion by abutting on the noncontact communication medium.

13 Claims, 9 Drawing Sheets

MAGNETIC TAPE CARTRIDGE AND MANUFACTURING METHOD OF MAGNETIC TAPE CARTRIDGE

CROSS-REFERENCE TO RELATED APPLICATION

This application claims priority from Japanese Patent Application No. 2023-028963, filed Feb. 27, 2023, the disclosure of which is incorporated herein by reference in its entirety.

BACKGROUND

Technical Field

The technology of the present disclosure relates to a magnetic tape cartridge and a manufacturing method of the magnetic tape cartridge.

Related Art

JP1999-306720A (JP-H11-306720A) describes a magnetic tape cartridge rotatably accommodating a single reel on which a magnetic tape is wound inside a cartridge case and comprising a flat noncontact memory element that is capable of storing information, in which the noncontact memory element has a non-effective region outside an effective region, which is a region capable of storing information, a through-hole is formed in the non-effective region, and the cartridge case has a columnar protrusion partially fitted into the through-hole of the memory element to hold the memory element at an angle of approximately 45 degrees with respect to a bottom surface of the cartridge case.

JP2006-323918A describes a recording and reproducing device for writing and reading data to and from a storage medium unit having a first storage medium on which data can be written and read, and a second storage medium of a different kind from the first storage medium on which data can be written and read, the recording and reproducing device comprising a loading portion in which the storage medium unit is detachably loaded, a first W/R portion for writing and reading data to and from the first storage medium with the storage medium unit loaded in the loading portion, and a second W/R portion for writing and reading data to and from the second storage medium with the storage medium unit loaded in the loading portion.

JP2021-150000A describes a recording tape cartridge comprising a case that accommodates a reel on which a recording tape is wound and includes a reference surface that serves as a reference in an axial direction of the reel in a case where the case is loaded into a drive device, a noncontact communication medium on which individual information is recorded, the noncontact communication medium being accommodated in the case and having a plate shape, a supporting portion that is formed in the case and supports one surface of the noncontact communication medium except for a lower end portion such that the noncontact communication medium is disposed while being inclined with respect to the reference surface at an angle of approximately 45 degrees, and a groove portion that is formed in the case and accommodates a portion of the lower end portion of the noncontact communication medium. One surface of the lower end portion of the noncontact communication medium is not in contact with the case.

SUMMARY

One embodiment according to the technology of the present disclosure provides a magnetic tape cartridge and a manufacturing method of the magnetic tape cartridge capable of suppressing a defect in an attachment state of a noncontact communication medium.

A first aspect of the technology of the present disclosure provides a magnetic tape cartridge comprising, a noncontact communication medium that is provided in a case and in which a through-hole penetrating a substrate in a plate thickness direction is formed; and a member having one end provided in the case, a shaft portion that is capable of positioning the noncontact communication medium in the case by being inserted into the through-hole, and a restriction portion that is provided at the other end of the member and that is configured to restrict displacement of the noncontact communication medium in a direction in which the noncontact communication medium comes off the shaft portion by abutting on the noncontact communication medium.

A second aspect according to the technology of the present disclosure is the magnetic tape cartridge according to the first aspect, in which the restriction portion has a diameter-increased portion having a diameter larger than a diameter of the through-hole, and the diameter-increased portion abuts on the peripheral edge of the through-hole.

A third aspect according to the technology of the present disclosure is the magnetic tape cartridge according to the second aspect, in which a diameter of the restriction portion increases from a distal end of the restriction portion toward the diameter-increased portion.

A fourth aspect according to the technology of the present disclosure is the magnetic tape cartridge according to the third aspect, in which a diameter of the distal end of the restriction portion is smaller than the diameter of the through-hole.

A fifth aspect according to the technology of the present disclosure is the magnetic tape cartridge according to the second aspect, in which the restriction portion has a truncated cone shape, and in the truncated cone shape, a lower bottom portion is the diameter-increased portion.

A sixth aspect according to the technology of the present disclosure is the magnetic tape cartridge according to the first aspect, in which the noncontact communication medium includes an antenna coil that is formed to go around an outer peripheral edge of the substrate, and the through-hole is formed on an inner peripheral side of the antenna coil.

A seventh aspect according to the technology of the present disclosure is the magnetic tape cartridge according to the first aspect, in which the shaft portion extends along a normal direction of the substrate in a state of being positioned in the case.

An eighth aspect according to the technology of the present disclosure is the magnetic tape cartridge according to the first aspect, in which the shaft portion extends along a normal direction of a bottom surface of the case.

A ninth aspect according to the technology of the present disclosure is the magnetic tape cartridge according to the eighth aspect, in which in a case where the noncontact communication medium is seen from a direction along a central axis of the shaft portion, a shape of the through-hole is a shape similar to a cross-sectional shape of the shaft portion.

A tenth aspect according to the technology of the present disclosure is the magnetic tape cartridge according to the first aspect, in which the restriction portion is integrally molded with the shaft portion.

An eleventh aspect according to the technology of the present disclosure is the magnetic tape cartridge according to the first aspect, in which the magnetic tape cartridge further comprises a support member that is formed in the case and that supports one surface of the noncontact communication medium in a manner in which the noncontact communication medium is disposed at a predetermined angle with respect to a reference surface of the case, and the noncontact communication medium is held between the restriction portion and the support member.

A twelfth aspect according to the technology of the present disclosure is the magnetic tape cartridge according to the first aspect, in which the member is a rod-like member.

A thirteenth aspect according to the technology of the present disclosure is the magnetic tape cartridge according to the first aspect, in which the restriction portion is configured to abut on at least a part of a peripheral edge of the through-hole.

A fourteenth aspect according to the technology of the present disclosure provides a manufacturing method of a magnetic tape cartridge comprising positioning a noncontact communication medium in a case by inserting a shaft portion that is a member having one end provided in the case into a through-hole penetrating a substrate of the noncontact communication medium in a plate thickness direction, and restricting displacement in a direction in which the noncontact communication medium comes off the shaft portion by abutting on the noncontact communication medium.

DETAILED DESCRIPTION

Figure 1:
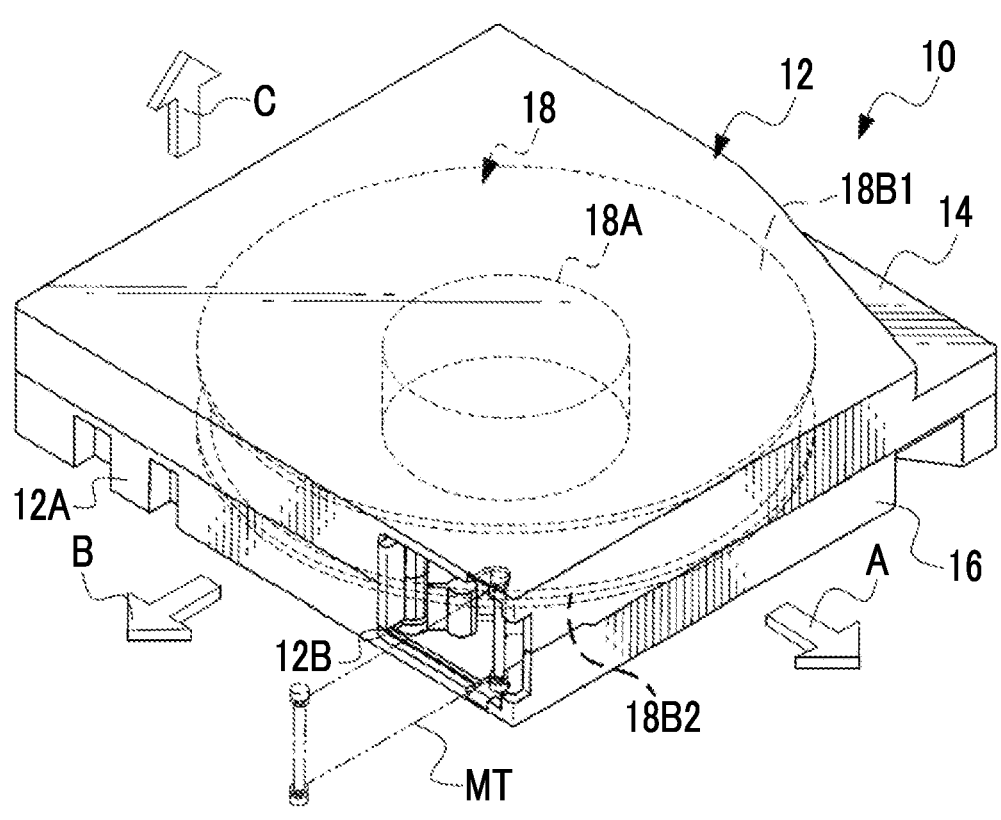
FIG. 1 is a schematic perspective view showing an example of the appearance of a magnetic tape cartridge according to an embodiment.

First, the wording used in the following explanation will be explained.

CPU is an abbreviation stands for "Central Processing Unit". RAM is an abbreviation stands for "Random Access Memory". NVM is an abbreviation stands for "Non-Volatile Memory". ROM is an abbreviation stands for "Read Only Memory". EEPROM is an abbreviation stands for "Electrically Erasable and Programmable Read Only Memory". SSD is an abbreviation stands for "Solid State Drive". USB is an abbreviation stands for "Universal Serial Bus". ASIC is an abbreviation stands for "Application Specific Integrated Circuit". PLD is an abbreviation stands for "Programmable Logic Device". FPGA is an abbreviation stands for "Field-Programmable Gate Array". SoC is an abbreviation stands for "System-on-a-Chip". IC is an abbreviation stands for "Integrated Circuit". RFID is an abbreviation stands for "Radio Frequency Identifier".

In the following description, for convenience of description, in FIG. 1, a loading direction of a magnetic tape cartridge 10 in a magnetic tape drive 30 (see FIG. 6) is indicated by an arrow A, a direction of the arrow A is referred to a front direction of the magnetic tape cartridge 10, and a side in the front direction of the magnetic tape cartridge 10 is referred to as a front side of the magnetic tape cartridge 10. In the following description on the structure, "front" indicates the front side of the magnetic tape cartridge 10.

In the following description, for convenience of description, in FIG. 1, a direction of an arrow B orthogonal to the direction of the arrow A is referred to as a right direction, and a side in the right direction of the magnetic tape cartridge 10 is referred to as a right side of the magnetic tape cartridge 10. In the following description on the structure, "right" indicates the right side of the magnetic tape cartridge 10.

In the following description, for convenience of description, in FIG. 1, a direction orthogonal to the direction of the arrow A and the direction of the arrow B is indicated by an arrow C, a direction of the arrow C is referred to as an upper direction of the magnetic tape cartridge 10, and a side in the upper direction of the magnetic tape cartridge 10 is referred to as an upper side of the magnetic tape cartridge 10. In the following description on the structure, "upper" indicates the upper side of the magnetic tape cartridge 10.

In the following description, for convenience of description, in FIG. 1, a direction opposite to the front direction of the magnetic tape cartridge 10 is referred to as a rear direction of the magnetic tape cartridge 10, and a side in the rear direction of the magnetic tape cartridge 10 is referred to as a rear side of the magnetic tape cartridge 10. In the following description on the structure, "rear" indicates the rear side of the magnetic tape cartridge 10.

In the following description, for convenience of description, in FIG. 1, a direction opposite to the up direction of the magnetic tape cartridge 10 is referred to as a lower direction of the magnetic tape cartridge 10, and a side in the lower direction of the magnetic tape cartridge 10 is referred to as a lower side of the magnetic tape cartridge 10. In the following description on the structure, "lower" indicates the lower side of the magnetic tape cartridge 10.

As shown in FIG. 1 as an example, the magnetic tape cartridge 10 has a substantially rectangular shape in plan view, and comprises a box-shaped case 12. The magnetic tape cartridge 10 is an example of a "magnetic tape cartridge" according to the technology of the present disclosure. The case 12 is formed of resin, such as polycarbonate, and comprises an upper case 14 and a lower case 16. The upper case 14 and the lower case 16 are bonded by welding (for example, ultrasonic welding) and screwing in a state in which a lower peripheral edge surface of the upper case 14 and an upper peripheral edge surface of the lower case 16 are brought into contact with each other. A bonding method is not limited to welding and screwing, and other bonding methods may be used. The case 12 is an example of a "case" according to the technology of the present disclosure.

Inside the case 12, a cartridge reel 18 is rotatably accommodated. The cartridge reel 18 comprises a reel hub 18A, an upper flange 18B1, and a lower flange 18B2. The reel hub 18A is formed in a cylindrical shape. The reel hub 18A is a shaft center portion of the cartridge reel 18, has a shaft center direction along an up-down direction of the case 12, and is disposed in a center portion of the case 12. Each of the upper flange 18B1 and the lower flange 18B2 is formed in an annular shape. A center portion in plan view of the upper flange 18B1 is fixed to an upper end portion of the reel hub 18A, and a center portion in plan view of the lower flange 18B2 is fixed to a lower end portion of the reel hub 18A. A magnetic tape MT is wound around an outer peripheral surface of the reel hub 18A, and an end portion of the magnetic tape MT in a width direction is held by the upper flange 18B1 and the lower flange 18B2. The reel hub 18A and the lower flange 18B2 may be molded integrally.

An opening 12B is formed on a front side of a right wall 12A of the case 12. The magnetic tape MT is pulled out from the opening 12B.

Figure 2:
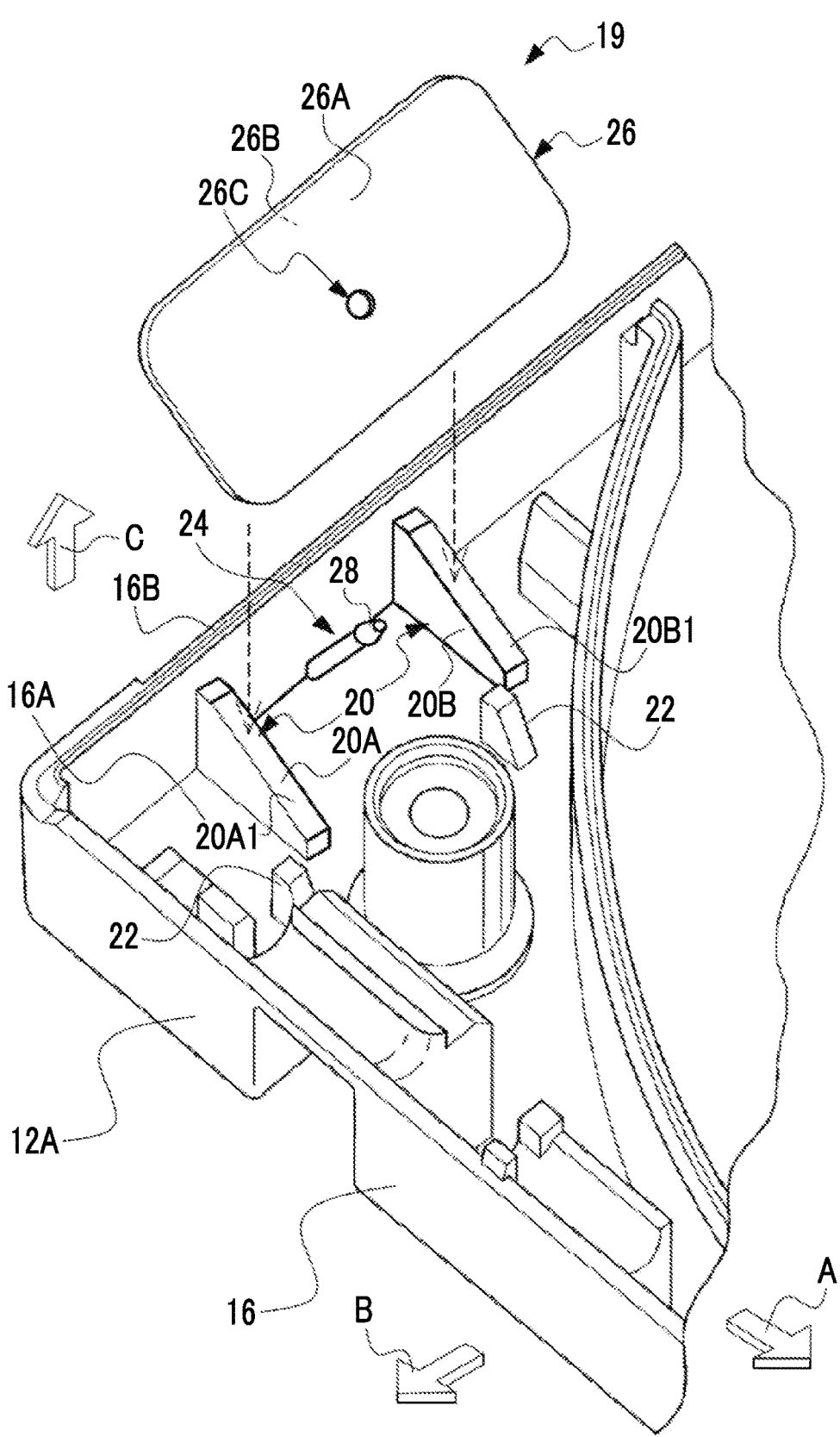
FIG. 2 is a schematic perspective view showing an example of the structure of a rear right end portion inside a lower case of the magnetic tape cartridge according to the embodiment.

As shown in FIG. 2 as an example, a cartridge memory 19 is accommodated in a rear right end portion of the lower case 16. The cartridge memory 19 is an example of a "noncontact communication medium" according to the technology of the present disclosure. In the present embodiment, a so-called passive type RFID tag is employed as the cartridge memory 19.

Management information is stored in the cartridge memory 19. The management information is information for managing the magnetic tape cartridge 10. Examples of the management information include identification information capable of specifying the magnetic tape cartridge 10, a recording capacity of the magnetic tape MT, the outline of information (hereinafter, referred to as "recorded information") recorded on the magnetic tape MT, items of the recorded information, and information indicating a recording format and the like of the recorded information.

The cartridge memory 19 performs communication with an external device (not shown) in a noncontact manner. Examples of the external device include a reading and writing device that is used in a production process of the magnetic tape cartridge 10 and a reading and writing device (for example, a noncontact reading and writing device 50 shown in FIGS. 6 and 7) that is used in a magnetic tape drive (for example, the magnetic tape drive 30 shown in FIG. 6).

The external device performs reading and writing of various kinds of information to the cartridge memory 19 in a noncontact manner. Although details will be described below, the cartridge memory 19 generates power with electromagnetic application to a magnetic field from the external device. Then, the cartridge memory 19 operates using the generated power and performs transfer of various kinds of information with the external device by performing communication with the external device through the magnetic field.

A support member 20 is provided on an inner surface of a bottom plate 16A of the rear right end portion of the lower case 16. The support member 20 is a member that supports the cartridge memory 19 in an aspect in which the cartridge memory 19 is disposed at a predetermined angle with respect to a reference surface 16A1 (see FIG. 5). The support member 20 is an example of a "support member" according to the technology of the present disclosure. In the example shown in FIG. 2, the support member 20 is a pair of inclined mounts that support the cartridge memory 19 from below in an inclined state. The pair of inclined mounts are a first inclined mount 20A and a second inclined mount 20B. The first inclined mount 20A and the second inclined mount 20B are disposed at an interval in a right-left direction of the case 12 and are modularized in an inner surface of a rear wall 16B of the lower case 16 and the inner surface of the bottom plate 16A. The first inclined mount 20A has an inclined surface 20A1, and the inclined surface 20A1 is inclined downward from the inner surface of the rear wall 16B toward the inner surface of the bottom plate 16A. In addition, an inclined surface 20B1 is also inclined downward from the inner surface of the rear wall 16B toward the inner surface of the bottom plate 16A.

In front of the support member 20, a pair of position restriction ribs 22 are disposed at an interval in the right-left direction. The pair of position restriction ribs 22 are provided upright on the inner surface of the bottom plate 16A and restrict a position of a lower end surface 19B of the cartridge memory 19 (see FIG. 5) in a state in which the cartridge memory 19 is disposed on the support member 20.

A shaft portion 24 is provided on the inner surface of the bottom plate 16A of the rear right end portion of the lower case 16. The shaft portion 24 is an example of a "shaft portion" according to the technology of the present disclosure. The shaft portion 24 is a rod-like member of which one end is attached to the inner surface of the lower case 16. Specifically, the shaft portion 24 is provided between the first inclined mount 20A and the second inclined mount 20B. One end of the shaft portion 24 is attached to a corner between the bottom plate 16A and the rear wall 16B of the lower case 16. The shaft portion 24 extends from the inner surface of the lower case 16 toward the cartridge memory 19. In other words, the shaft portion 24 extends along a normal direction (that is, the plate thickness direction) of the cartridge memory 19 after being positioned in the case 12. In addition, although details will be described below, a restriction portion 28 that is insertable into a through-hole 26C of the cartridge memory 19 is provided at the other end of the shaft portion 24.

The cartridge memory 19 comprises a substrate 26. The substrate 26 is an example of a "substrate" according to the technology of the present disclosure. The substrate 26 is a flexible substrate. The substrate 26 has a quadrangular flat plate shape in which each corner portion is chamfered in an arc shape as an example. The substrate 26 has two surfaces in a plate thickness direction, that is, a front surface 26A and a back surface 26B. The substrate 26 is placed on the support member 20 such that the back surface 26B of the substrate 26 turns toward a lower side, and the support member 20 supports the back surface 26B of the substrate 26 from below. A part of the back surface 26B of the substrate 26 is in contact with the inclined surface of the support member 20, that is, the inclined surfaces 20A1 and 20B1, and the front surface 26A of the substrate 26 is exposed to an upper case 14 side.

The through-hole 26C is formed on the substrate 26 of the cartridge memory 19. The through-hole 26C is formed by penetrating the substrate 26 along the plate thickness direction of the substrate 26. The through-hole 26C is formed, for example, in a press punching process for forming the substrate 26. The restriction portion 28 and the shaft portion 24 can be inserted into the through-hole 26C. The through-hole 26C is an example of a "through-hole" according to the technology of the present disclosure.

Figure 3:
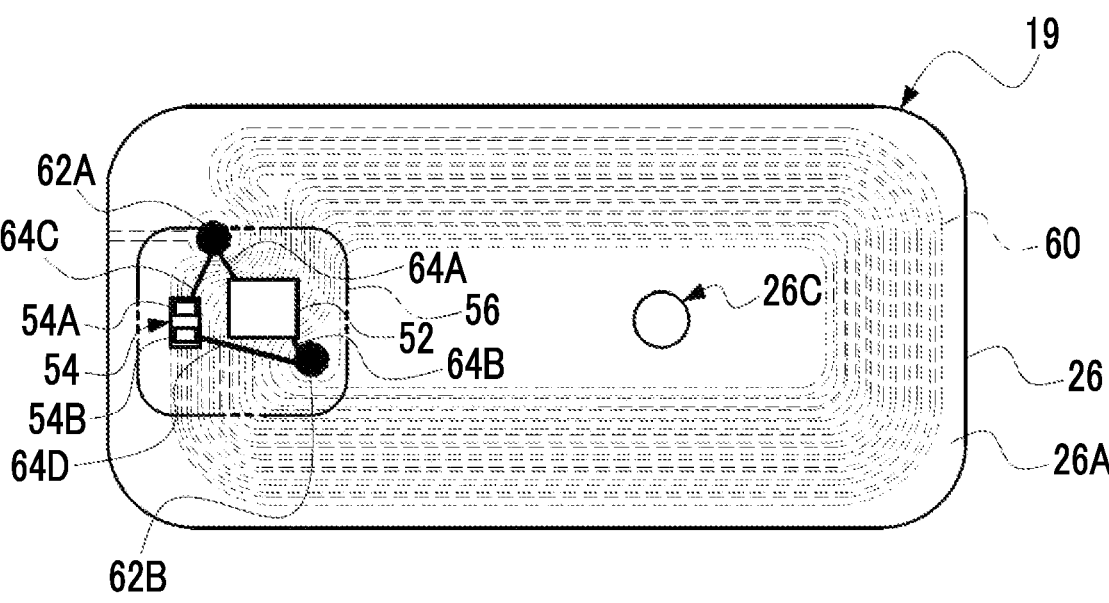
FIG. 3 is a plan view showing an example of the structure of a cartridge memory according to the embodiment.

As shown in FIG. 3 as an example, an IC chip 52 and a capacitor 54 are mounted on the front surface 26A of the cartridge memory 19. The IC chip 52 and the capacitor 54 are bonded to the front surface 26A. In addition, the IC chip 52 and the capacitor 54 are sealed with a sealing material 56 on the front surface 26A of the cartridge memory 19. Here, as the sealing material 56, an ultraviolet curable resin that is cured by reacting with ultraviolet rays is employed. The ultraviolet curable resin is merely an example, and photocurable resin that is cured by light in a wavelength range other than ultraviolet rays may be used as the sealing material 56, thermosetting resin may be used as the sealing material 56, or an adhesive may be used as the sealing material 56.

A coil 60 is formed in a loop shape on the back surface 26B (see FIG. 2) of the cartridge memory 19. In other words, the coil 60 is formed in such a manner that it goes around an outer peripheral edge of the substrate 26. Here, copper foil is employed as a material of the coil 60. The copper foil is merely an example, and, for example, other types of conductive materials, such as aluminum foil, may be used. The coil 60 induces an induced current with application of a magnetic field MF (see FIG. 7) from the noncontact reading and writing device 50. The coil 60 is an example of an "antenna coil" according to the technology of the present disclosure.

A first conduction portion 62A and a second conduction portion 62B are provided on the back surface 26B of the cartridge memory 19. The first conduction portion 62A and the second conduction portion 62B have solder, and electrically connect both end portions of the coil 60 to the IC chip 52 and the capacitor 54 on the front surface 26A.

On the front surface 26A of the cartridge memory 19, the IC chip 52 and the capacitor 54 are electrically connected to each other using a wire connection method. Specifically, one terminal of a positive electrode terminal and a negative electrode terminal of the IC chip 52 is connected to the first conduction portion 62A through a wiring 64A, and the other terminal is connected to the second conduction portion 62B through a wiring 64B. The capacitor 54 has a pair of electrodes. In the example shown in FIG. 3, the pair of electrodes are electrodes 54A and 54B. The electrode 54A is connected to the first conduction portion 62A through a wiring 64C, and the electrode 54B is connected to the second conduction portion 62B through a wiring 64D. With this, the IC chip 52 and the capacitor 54 are connected in parallel with the coil 60.

The through-hole 26C is formed on an inner peripheral side of the coil 60 formed in a loop shape. That is, in plan view of the cartridge memory 19, the through-hole 26C is positioned on the inner peripheral side of the coil 60.

In addition, the through-hole 26C is formed while avoiding the IC chip 52 and the capacitor 54. That is, the through-hole 26C is provided at a position different from the positions of the IC chip 52 and the capacitor 54 in plan view of the cartridge memory 19. With this, restrictions on the size or disposition of the IC chip 52 and the capacitor 54 is suppressed.

Further, the through-hole 26C is formed while avoiding a region sealed with the sealing material 56. That is, in plan view of the cartridge memory 19, the through-hole 26C is provided at a position different from the region sealed with the sealing material 56. With this, it is suppressed that the sealing by the sealing material 56 is broken by the through-hole 26C.

Figure 4:
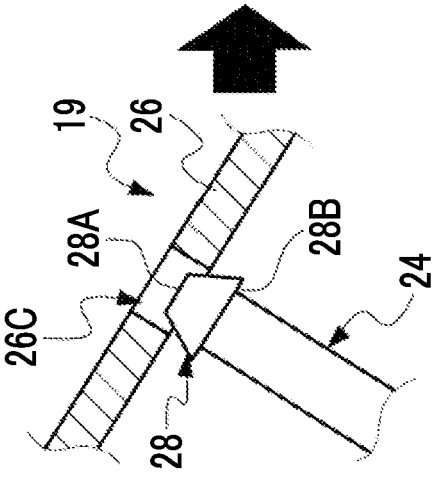
FIG. 4 is a conceptual diagram showing an example of a state in which the cartridge memory according to the embodiment is attached to a shaft portion.
Figure 4:
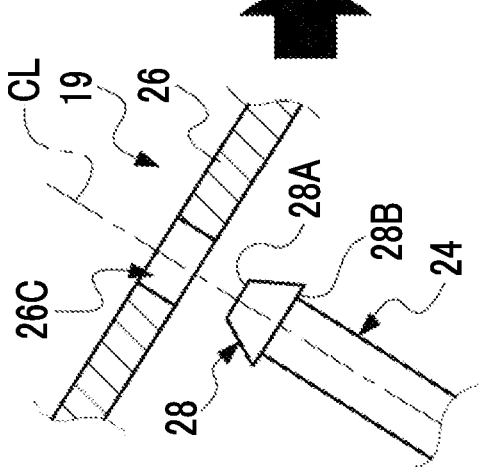

As shown on the left side of FIG. 4 as an example, in the assembly work of the cartridge memory 19 to the case 12, the cartridge memory 19 is first moved toward the shaft portion 24 along a central axis CL of the shaft portion 24. In this case, a position of the through-hole 26C formed on the substrate 26 is a position facing the restriction portion 28 provided at a distal end of the shaft portion 24. In the example shown in FIG. 4, the restriction portion 28 has a truncated cone shape. In the truncated cone shape of the restriction portion 28, an upper bottom portion 28A is located at a distal end of the restriction portion 28, and a lower bottom portion 28B is located on the shaft portion 24 side of the restriction portion 28. The restriction portion 28 has a shape in which a diameter increases from the distal end of the restriction portion 28 toward the shaft portion 24. That is, the diameter of the restriction portion 28 increases from the upper bottom portion 28A to the lower bottom portion 28B. In addition, the restriction portion 28 is integrally molded with the shaft portion 24. The restriction portion 28 is an example of a "restriction portion" according to the technology of the present disclosure. In addition, the lower bottom portion 28B is an example of a "diameter-increased portion" and a "lower bottom portion" according to the technology of the present disclosure.

Here, a diameter of the upper bottom portion 28A is smaller than a diameter of the through-hole 26C. In addition, a diameter of the lower bottom portion 28B is larger than the diameter of the through-hole 26C. In addition, the diameter of the lower bottom portion 28B is set to a diameter that does not cause plastic deformation of the substrate 26 in a case where the restriction portion 28 is inserted into the through-hole 26C. For example, the diameter of the lower bottom portion 28B is larger than the diameter of the through-hole 26C by about 5%.

As shown in the center of FIG. 4, in a case where the cartridge memory 19 is moved toward the shaft portion 24, the upper bottom portion 28A of the restriction portion 28 is inserted into the through-hole 26C of the cartridge memory 19. Then, the cartridge memory 19 moves toward the shaft portion 24 while the through-hole 26C is guided to the restriction portion 28. That is, the cartridge memory 19 moves toward the shaft portion 24 while an inner peripheral surface of the through-hole 26C abuts on an outer peripheral surface of the restriction portion 28. In this case, the through-hole 26C is elastically deformed by being pressed by the outer peripheral surface of the restriction portion 28, and the through-hole 26C expands. Then, the restriction portion 28 is inserted into the through-hole 26C in a state in which the diameter of the through-hole 26C is temporarily increased.

Then, as shown on the right side of FIG. 4, in a case where the through-hole 26C passes through the restriction portion 28, the cartridge memory 19 is located at the distal end of the shaft portion 24. Since an outer diameter of the shaft portion 24 is smaller than the diameter of the through-hole 26C, the through-hole 26C returns to the diameter before the restriction portion 28 is inserted. Then, the inner peripheral surface of the through-hole 26C abuts on the outer peripheral surface of the shaft portion 24, so that the cartridge memory 19 is suppressed from shifting in the in-plane direction. That is, the cartridge memory 19 is positioned in the lower case 16 by inserting the shaft portion 24 into the through-hole 26C.

Figure 5:
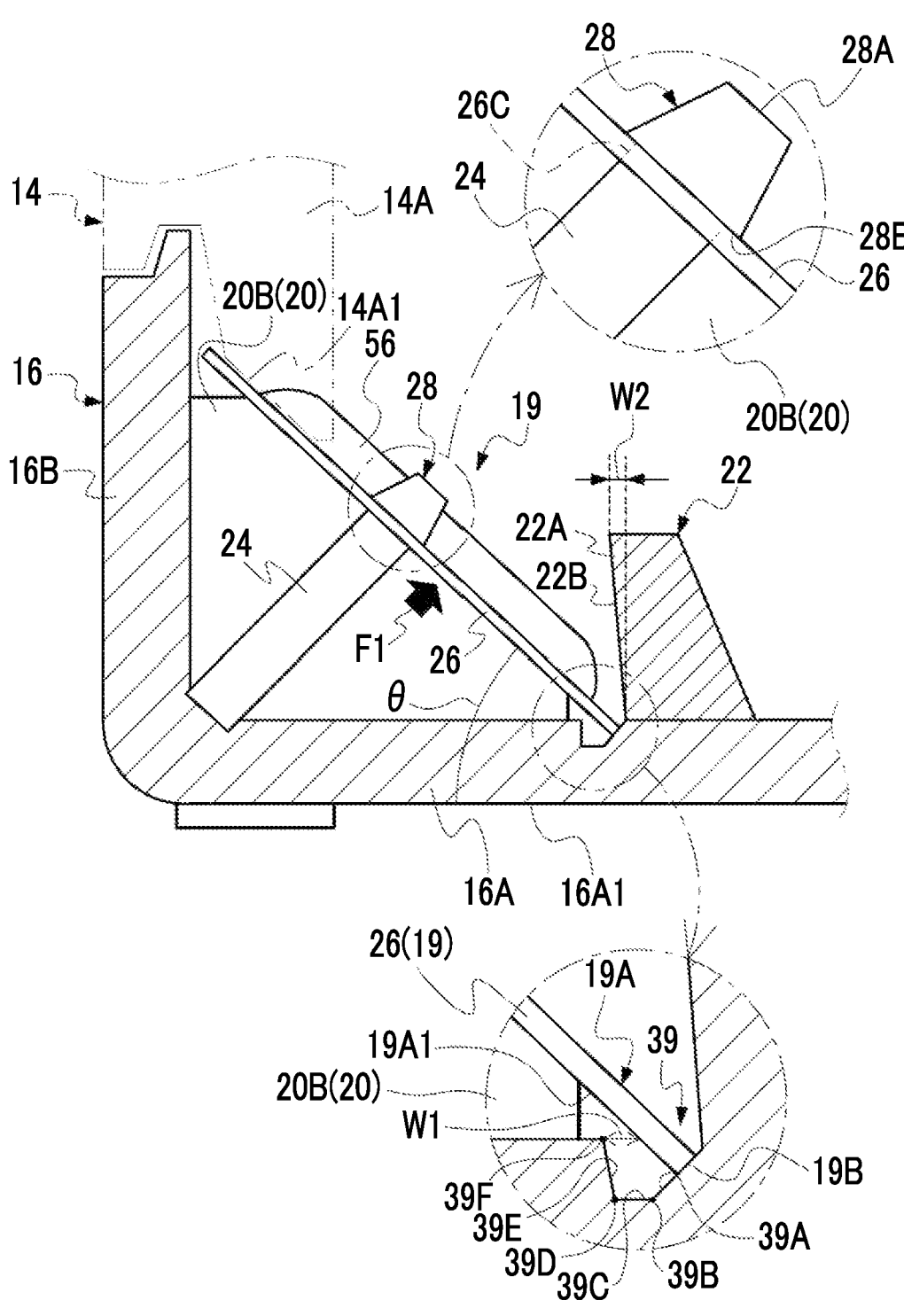
FIG. 5 is a conceptual diagram showing an example of a state in which the cartridge memory according to the embodiment is provided in the magnetic tape cartridge.

As shown in FIG. 5 as an example, the cartridge memory 19 that has passed through the restriction portion 28 is held at a predetermined position with respect to the lower case 16. Specifically, the cartridge memory 19 is held between the lower bottom portion 28B of the restriction portion 28 and the inclined mount 20B. The reference surface 16A1 is formed on an outer surface of the bottom plate 16A. The reference surface 16A1 is a plane. Here, the plane indicates a surface parallel to a horizontal plane in a case where the lower case 16 is placed on the horizontal plane such that the bottom plate 16A turns toward a lower side.

An inclined angle θ of the support member 20, that is, an inclined angle of each of the inclined surface 20A1 and the inclined surface 20B1 is 45 degrees with respect to the reference surface 16A1. The cartridge memory 19 is held in the lower case 16 at 45 degrees with respect to the reference surface 16A1. The inclined angle of 45 degrees is merely an example, and may be in a range of "0 degrees<inclined angle θ<45 degrees" or may be equal to or greater than 45 degrees.

By the way, in a manufacturing stage of the magnetic tape cartridge 10, a force F1 in a direction in which the cartridge memory 19 comes off the shaft portion 24 may act on the cartridge memory 19. In a case where the force F1 acts on the cartridge memory 19 in a state in which the cartridge memory 19 is positioned in the lower case 16, the cartridge memory 19 comes off the shaft portion 24 without the restriction portion 28 and the cartridge memory 19 is not positioned in the lower case 16. In this state, in a case where the upper case 14 and the lower case 16 are bonded to each other and the rib 14A of the upper case 14 abuts on the cartridge memory 19, the cartridge memory 19 is fixed to the case 12 in a state of being deformed (for example, in a bent state). This causes damage to the cartridge memory 19 or a reading and writing defect with respect to the cartridge memory 19.

Therefore, the restriction portion 28 is provided at the distal end of the shaft portion 24. In a case where the force F1 acts on the cartridge memory 19, a peripheral edge of the through-hole 26C abuts on the lower bottom portion 28B of the restriction portion 28. As a result, it is suppressed that the cartridge memory 19 comes off the shaft portion 24. In this way, the restriction portion 28 restricts displacement in a direction in which the cartridge memory 19 comes off the shaft portion 24 (for example, displacement in a direction along the central axis CL of the shaft portion 24) by abutting on a peripheral edge of the through-hole 26C. Then, in a state in which the cartridge memory 19 is held at a predetermined position in the lower case 16, the upper case 14 and the lower case 16 are bonded, and the cartridge memory 19 is accommodated in the case 12.

In a case where the upper case 14 is bonded to the lower case 16 as described above in a state in which the cartridge memory 19 is disposed in the support member 20, a distal end surface 14A1 of each rib 14A comes into contact with the substrate 26 from the front surface 26A side, and the substrate 26 is pinched by the distal end surface 14A1 of each rib 14A and the inclined surface of the support member 20. With this, a position in an up-down direction of the cartridge memory 19 is restricted by the ribs 14A.

In addition, as shown in FIG. 5, a groove portion 39 in which a part of the lower end portion 19A of the cartridge memory 19 is to be accommodated is formed on the inner surface of the bottom plate 16A of the lower case 16. The groove portion 39 is formed in an approximately trapezoidal shape and includes an inclined surface 39A on which the lower end surface 19B of the cartridge memory 19 abuts, a bottom surface 39C that continues from a lower edge portion 39B of the inclined surface 39A and extends rearward, and a vertical wall surface 39E that continues from a rear edge portion 39D of the bottom surface 39C and extends upward. With this, for example, it is possible to stabilize the posture of the cartridge memory 19 in comparison with a configuration in which the cartridge memory 19 is disposed by abutting an upper edge portion and a lower edge portion of the lower end surface 19B, respectively, on a side surface and a bottom surface forming a perpendicular corner portion in a side view (that is, a gap is formed between the lower end surface 19B and the corner portion).

A lower surface 19A1 of the lower end portion 19A of the cartridge memory 19 is not in contact with an upper edge portion 39F of the vertical wall surface 39E. In other words, a gap W1 (for example, a length W1 in the direction along the inner surface of the bottom plate 16A is about 0.5 mm) is formed between the lower surface 19A1 and the upper edge portion 39F. With this, there is no risk that the cartridge memory 19 is caught on the upper edge portion 39F and distorted during assembly, and the cartridge memory 19 can be stably assembled by a robot hand or the like.

A position restriction rib 22 has an overlapping portion 22A that projects to a position above the cartridge memory 19. That is, a rear end portion 22B of the position restriction rib 22 is inclined rearward with respect to the vertical direction of the bottom plate 16A so that the upper end portion is located rearward of the lower end portion by a predetermined length W2 (For example, W2=about 0.5 mm) in a side view. The upper end portion of the rear end portion 22B is the overlapping portion 22A. With this, even though the lower case 16 in which the cartridge memory 19 is disposed is transported, the misregistration of the light-weight cartridge memory 19 can be more suppressed.

Here, although an example of a form in which the groove portion 39 and the overlapping portion 22A are formed in the case 12 has been described, this is merely an example. The technology of the present disclosure is established even in a case in which the groove portion 39 and the overlapping portion 22A are not formed in the case 12.

Figure 6:
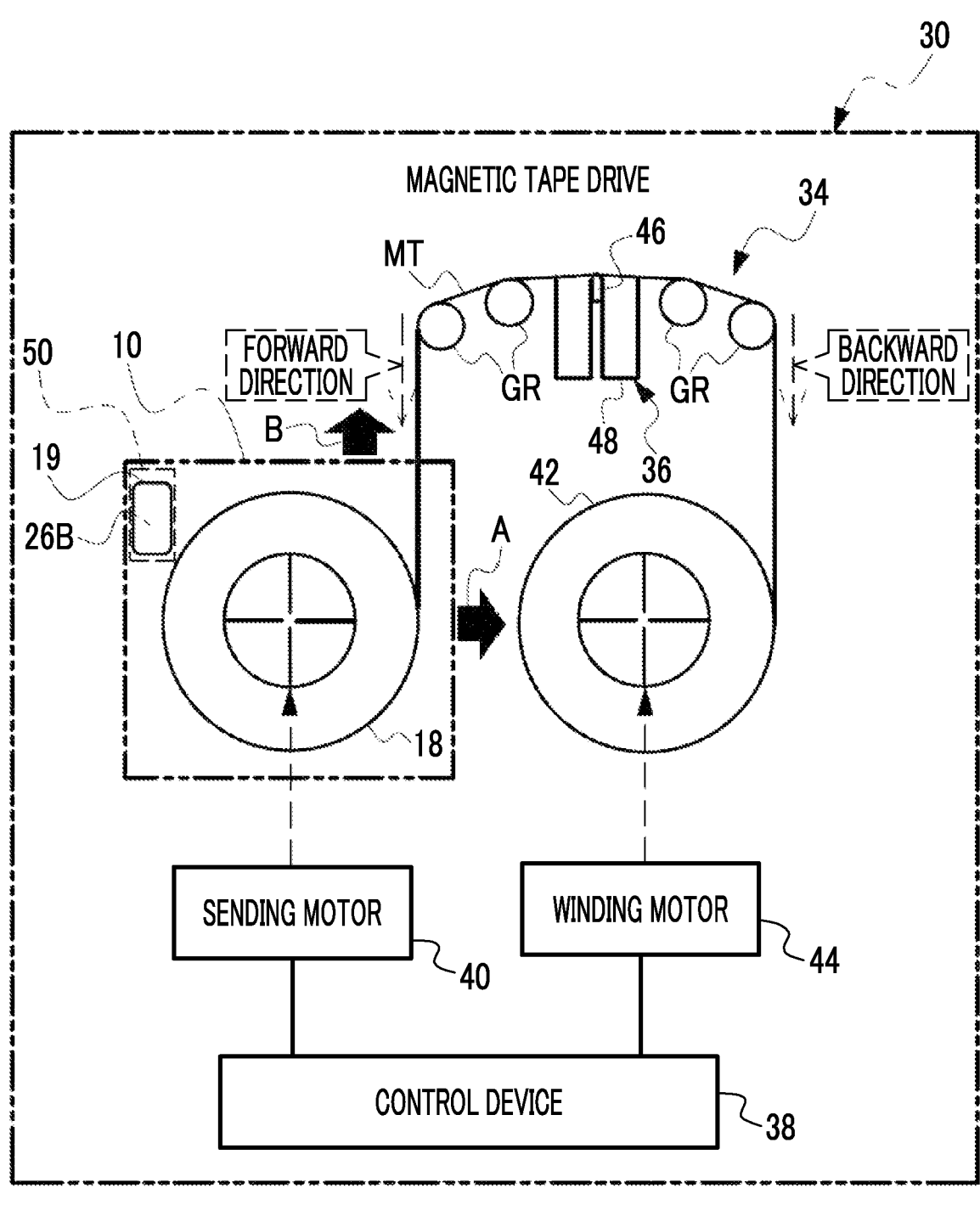
FIG. 6 is a schematic configuration diagram showing an example of the hardware configuration of a magnetic tape drive according to the embodiment.

As shown in FIG. 6 as an example, the magnetic tape drive 30 comprises a transport device 34, a reading head 36, and a control device 38. The magnetic tape cartridge 10 is loaded into the magnetic tape drive 30. The magnetic tape drive 30 is a device that pulls out the magnetic tape MT from the magnetic tape cartridge 10 and that reads recorded information from the pulled-out magnetic tape MT using the reading head 36 by a linear serpentine method. In the present embodiment, in other words, reading of the recorded information indicates reproduction of the recorded information.

The control device 38 controls the entire magnetic tape drive 30. In the present embodiment, although the control device 38 is realized by an ASIC, the technology of the present disclosure is not limited thereto. For example, the control device 38 may be realized by an FPGA. In addition, the control device 38 may be realized by a computer including a CPU, a ROM, and a RAM. In addition, the control device 38 may be realized by combining two or more of an ASIC, an FPGA, a PLD, and a computer. That is, the control device 38 may be realized by a combination of a hardware configuration and a software configuration.

The transport device 34 is a device that selectively transports the magnetic tape MT in a forward direction and a backward direction, and comprises a sending motor 40, a winding reel 42, a winding motor 44, a plurality of guide rollers GR, and the control device 38.

The sending motor 40 rotationally drives the cartridge reel 18 in the magnetic tape cartridge 10 under the control of the control device 38. The control device 38 controls the sending motor 40 to control a rotation direction, a rotation speed, rotation torque, and the like of the cartridge reel 18.

The winding motor 44 rotationally drives the winding reel 42 under the control of the control device 38. The control device 38 controls the winding motor 44 to control a rotation direction, a rotation speed, rotation torque, and the like of the winding reel 42.

In a case where the magnetic tape MT is wound around the winding reel 42, the sending motor 40 and the winding motor 44 are rotated by the control device 38 such that the magnetic tape MT runs in the forward direction. Rotation speeds, rotation torque, and the like of the sending motor 40 and the winding motor 44 are adjusted depending on a speed of the magnetic tape MT wound around the winding reel 42.

In a case where the magnetic tape MT is rewound to the cartridge reel 18, the sending motor 40 and the winding motor 44 are rotated by the control device 38 such that the magnetic tape MT runs in the backward direction. Rotation speeds, rotation torque, and the like of the sending motor 40 and the winding motor 44 are adjusted depending on a speed of the magnetic tape MT wound around the winding reel 42.

The rotation speed, the rotation torque, and the like of each of the sending motor 40 and the winding motor 44 are adjusted in this manner, whereby tension in a predetermined range is applied to the magnetic tape MT. Here, the predetermined range indicates, for example, a range of tension obtained from a computer simulation and/or a test with a real machine as a range of tension in which data can be read from the magnetic tape MT by the reading head 36.

In the present embodiment, although the rotation speed, the rotation torque, and the like of each of the sending motor 40 and the winding motor 44 are controlled such that the tension of the magnetic tape MT is controlled, the technology of the present disclosure is not limited thereto. For example, the tension of the magnetic tape MT may be controlled using a dancer roller or may be controlled by drawing the magnetic tape MT to a vacuum chamber.

Each of the plurality of guide rollers GR is a roller that guides the magnetic tape MT. A running path of the magnetic tape MT is determined by separately disposing the plurality of guide rollers GR at positions straddling over the reading head 36 between the magnetic tape cartridge 10 and the winding reel 42.

The reading head 36 comprises a reading element 46 and a holder 48. The reading element 46 is held by the holder 48 to come into contact with the magnetic tape MT during running, and reads recorded information from the magnetic tape MT transported by the transport device 34.

The magnetic tape drive 30 comprises the noncontact reading and writing device 50. The noncontact reading and writing device 50 is disposed to confront the back surface 26B of the cartridge memory 19 below the magnetic tape cartridge 10 in a state in which the magnetic tape cartridge 10 is loaded into the magnetic tape drive 30. The state in which the magnetic tape cartridge 10 is loaded into the magnetic tape drive 30 indicates, for example, a state in which the magnetic tape cartridge 10 reaches a position determined in advance as a position where reading of recorded information from the magnetic tape MT by the reading head 36 starts.

Figure 7:
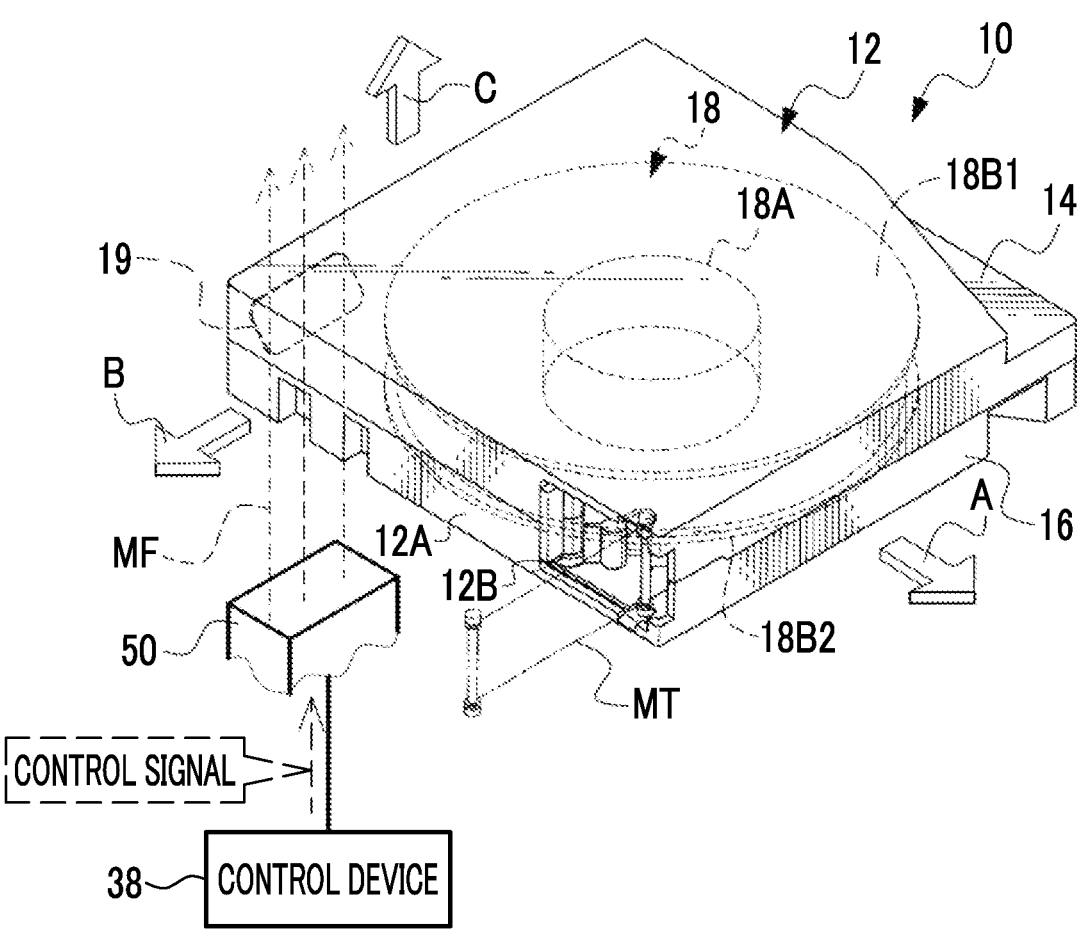
FIG. 7 is a schematic perspective view showing an example of an aspect in which a magnetic field is released by a noncontact reading and writing device from a lower side of the magnetic tape cartridge according to the embodiment.

As shown in FIG. 7 as an example, the noncontact reading and writing device 50 releases the magnetic field MF from below the magnetic tape cartridge 10 toward the cartridge memory 19. The magnetic field MF passes through the cartridge memory 19. The noncontact reading and writing device 50 is connected to the control device 38. The control device 38 outputs a control signal for controlling the cartridge memory 19 to the noncontact reading and writing device 50. The noncontact reading and writing device 50 releases the magnetic field MF toward the cartridge memory 19 in accordance with the control signal input from the control device 38.

The noncontact reading and writing device 50 spatially transmits a command signal to the cartridge memory 19 under the control of the control device 38. The command signal is a signal indicating a command to the cartridge memory 19. In a case where the command signal is spatially transmitted from the noncontact reading and writing device 50 to the cartridge memory 19, the command signal, which is spatially transmitted from the noncontact reading and writing device 50, is included in the magnetic field MF in response to an instruction from the control device 38. In other words, the command signal is superimposed on the magnetic field MF. That is, the noncontact reading and writing device 50 transmits the command signal to the cartridge memory 19 through the magnetic field MF under the control of the control device 38.

Next, an assembly process of the cartridge memory 19 according to the present embodiment will be described referring to FIG. 8. An assembly process of the cartridge memory 19 is a part of a manufacturing process of the magnetic tape cartridge 10. The flow of the assembly process of the cartridge memory 19 shown in FIG. 8 is an example of a "manufacturing method of a magnetic tape cartridge" according to the technology of the present disclosure.

Figure 8:
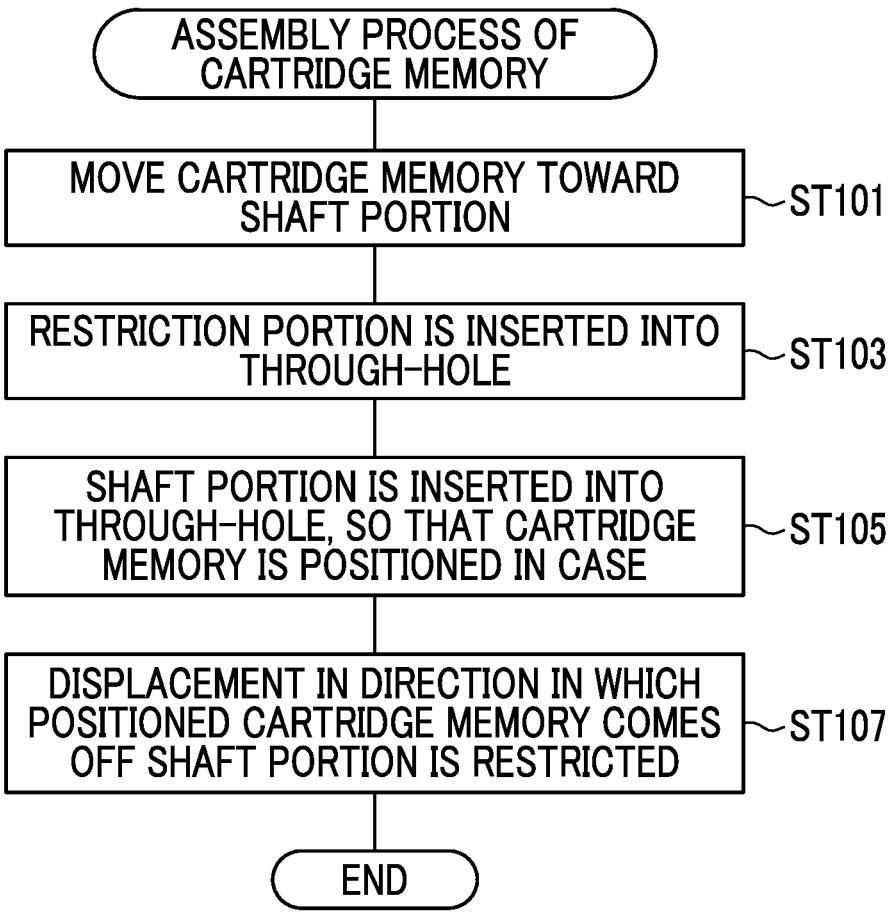
FIG. 8 is a flowchart showing an example of an assembly process of the cartridge memory according to the embodiment.

In the assembly process of the cartridge memory 19 shown in FIG. 8 as an example, first, in Step ST101, the cartridge memory 19 moves toward the shaft portion 24 along a direction of the central axis CL of the shaft portion 24. Thereafter, the assembly process progresses to Step ST103.

In Step ST103, the restriction portion 28 provided at the distal end of the shaft portion 24 is inserted into the through-hole 26C. Thereafter, the assembly process progresses to Step ST105.

In Step ST105, after the restriction portion 28 passes through the through-hole 26C in Step ST103, the shaft portion 24 is inserted into the through-hole 26C formed on the substrate 26 of the cartridge memory 19, so that the cartridge memory 19 is positioned in the case 12. Thereafter, the assembly process progresses to Step ST107.

In Step ST107, the displacement in a direction in which the cartridge memory 19 positioned in Step ST105 comes off the shaft portion 24 is restricted. With this, the assembly process of the cartridge memory 19 ends.

As described above, in the magnetic tape cartridge 10 according to the present embodiment, the shaft portion 24 is inserted into the through-hole 26C formed on the substrate 26 of the cartridge memory 19, whereby the cartridge memory 19 is positioned in the case 12. Then, the restriction portion 28 provided at the distal end of the shaft portion 24 abuts on the peripheral edge of the through-hole 26C so that the displacement in the direction in which the cartridge memory 19 comes off the shaft portion 24 is restricted. With this, the cartridge memory 19 is positioned in the case 12, and the cartridge memory 19 is suppressed from coming off the shaft portion 24. As a result, the occurrence of a defect in an attachment state of the cartridge memory 19 in the magnetic tape cartridge 10 is suppressed.

For example, a case where the restriction portion 28 is not provided in the shaft portion 24 is considered. In this case, in the assembly work of the cartridge memory 19, after the positioning of the cartridge memory 19 in the lower case 16 by the shaft portion 24, the upper case 14 is bonded to the lower case 16, and the upward displacement of the cartridge memory 19 is restricted by the rib 14A. However, in this case, the cartridge memory 19 may come off the shaft portion 24 until the upper case 14 is attached. For example, an unexpected external factor (for example, vibration on the cartridge memory 19) in the assembly work can cause a force F1 to act on the cartridge memory 19. With this, the cartridge memory 19 comes off the shaft portion 24 in the lower case 16. In a case where the upper case 14 is attached as described above, since the cartridge memory 19 is not positioned, a defect in an attachment state of the cartridge memory 19 occurs. In this configuration, since the restriction portion 28 is provided at the distal end of the shaft portion 24, after the cartridge memory 19 is positioned in the lower case 16, the displacement in the direction in which the cartridge memory 19 comes off the shaft portion 24 is suppressed even through the force F1 acts on the cartridge memory 19. For this reason, the occurrence of a defect in an attachment state of the cartridge memory 19 is suppressed.

In addition, in the magnetic tape cartridge 10 according to the present embodiment, the restriction portion 28 comprises the lower bottom portion 28B. The lower bottom portion 28B has a diameter larger than that of the through-hole 26C, and the lower bottom portion 28B abuts on the peripheral edge of the through-hole 26C. Since the peripheral edge of the through-hole 26C abuts on the lower bottom portion 28B, the displacement in the direction in which the cartridge memory 19 comes off the shaft portion 24 is restricted over a wider range compared with, for example, a case in which the displacement of the cartridge memory 19 is restricted at only one place of the peripheral edge, so that the cartridge memory 19 is less likely to come off the shaft portion 24.

In addition, in the magnetic tape cartridge 10 according to the present embodiment, the restriction portion 28 has a shape in which the diameter increases from the distal end of the restriction portion 28 toward the lower bottom portion 28B. With this, in a case of attaching the cartridge memory 19, since the through-hole 26C is guided along the outer peripheral surface of the restriction portion 28, the attachment work of the cartridge memory 19 is facilitated.

In addition, in the magnetic tape cartridge 10 according to the present embodiment, a diameter of the upper bottom portion 28A of the restriction portion 28 is smaller than the diameter of the through-hole 26C. With this, it is easy to insert the upper bottom portion 28A of the restriction portion 28 into the through-hole 26C. As a result, the attachment work of the cartridge memory 19 is facilitated.

In addition, in the magnetic tape cartridge 10 according to the present embodiment, the restriction portion 28 has a truncated cone shape, and the lower bottom portion 28B abuts on the peripheral edge of the through-hole 26C in the truncated cone shape. With this, since the structure of the restriction portion 28 is simplified, manufacturing the magnetic tape cartridge 10 becomes easier.

In addition, in the magnetic tape cartridge 10 according to the present embodiment, the cartridge memory 19 comprises the coil 60 formed to go around the outer peripheral edge of the substrate 26. The through-hole 26C is formed on the inner peripheral side of the coil 60. The coil 60 is formed to go around the outer peripheral edge of the substrate 26 to improve stability and/or speed of noncontact communication using the coil 60. In a case where the through-hole 26C is provided on the outer peripheral side of the coil 60, it is required to enlarge the substrate 26 by the size of the through-hole 26C or narrow the width of the coil 60. In this configuration, the through-hole 26C is provided on the inner peripheral side of the coil 60, so that miniaturization of the cartridge memory 19 is realized while securing the width of the coil 60.

In addition, in the magnetic tape cartridge 10 according to the present embodiment, the shaft portion 24 extends along the normal direction of the substrate 26 in a state of being positioned in the case 12. The through-hole 26C is formed along the normal direction (that is, a plate thickness direction) of the substrate 26. With this, the insertion direction of the shaft portion 24 coincides with the direction in which the through-hole 26C is formed, so that it is easy to attach the through-hole 26C to the shaft portion 24.

In addition, in the magnetic tape cartridge 10 according to the present embodiment, the restriction portion 28 is integrally molded with the shaft portion 24. With this, for example, the bonding between the restriction portion 28 and the shaft portion 24 is strengthened as compared with a case where the restriction portion 28 is a separate component from the shaft portion 24, the separation of the restriction portion 28 from the shaft portion 24 is suppressed.

In addition, in the magnetic tape cartridge 10 according to the present embodiment, the inclined mounts 20A and 20B are provided in the case 12, and the inclined mounts 20A and 20B support the back surface 26B of the cartridge memory 19 from below. The inclined surfaces 20A1 and 20B1 of the inclined mounts 20A and 20B are at predetermined angles (for example, 45 degrees), and the cartridge memory 19 is disposed in the case 12 at 45 degrees. Then, the cartridge memory 19 is held between the restriction portion 28 and the inclined mounts 20A and 20B. With this, a state in which the cartridge memory 19 is disposed in the case 12 at a predetermined angle is also held by the restriction portion 28, so that the accuracy of positioning the cartridge memory 19 is improved.

Modification Example

In the above-described embodiment, although an example of a form in which the shaft portion 24 extends along the normal direction of the cartridge memory 19 has been described, the technology of the present disclosure is not limited thereto. In the present modification example, the shaft portion 24 extends along a normal direction of the bottom plate 16A of the lower case 16.

Figure 9:
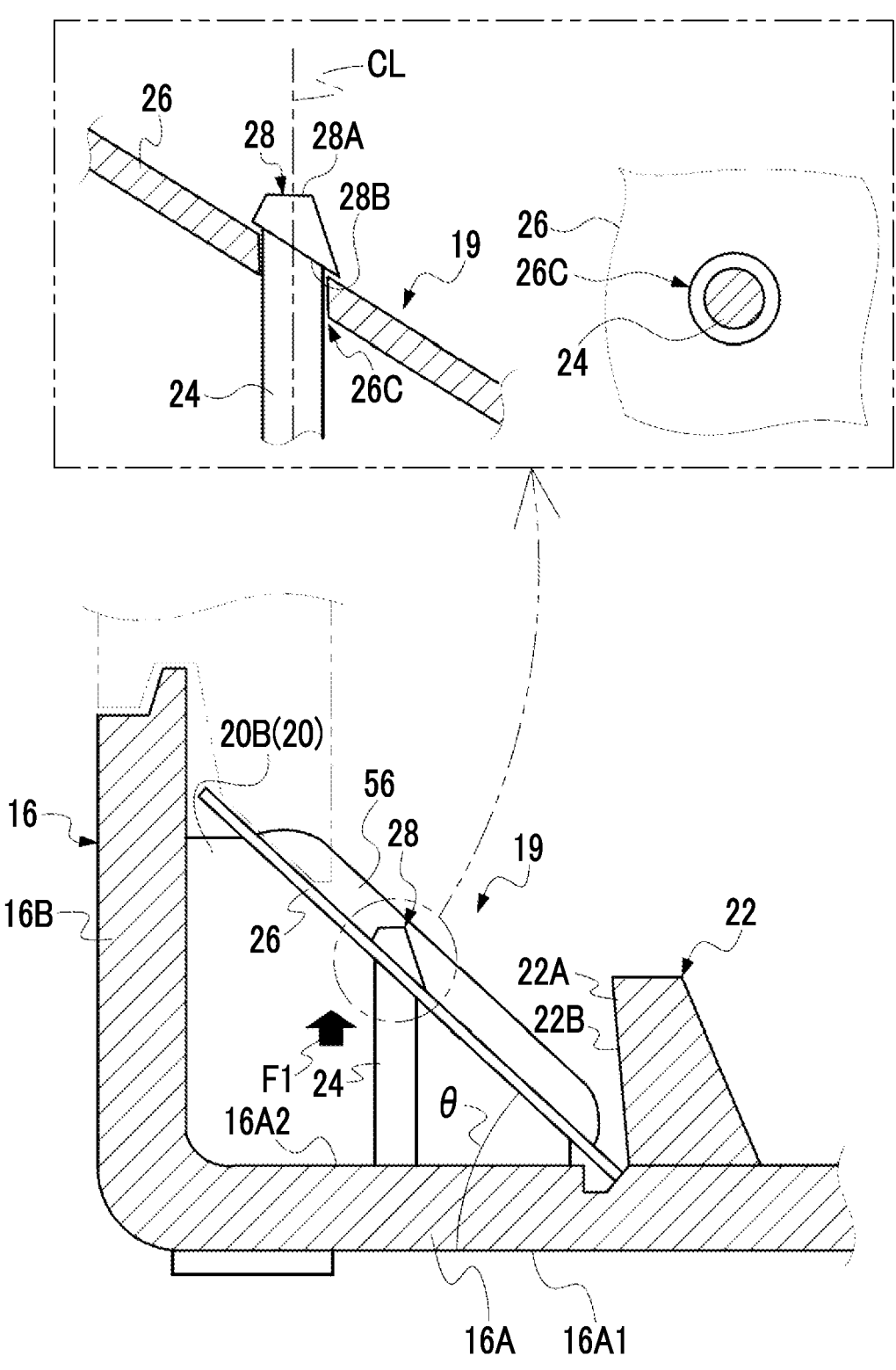
FIG. 9 is a conceptual diagram showing an example of a state in which a cartridge memory according to a modification example is attached to a shaft portion.

As shown in FIG. 9 as an example, the shaft portion 24 is provided on the inner surface of the lower case 16. The shaft portion 24 is a rod-like member of which one end is attached to the inner surface of the bottom plate 16A of the lower case 16. The shaft portion 24 extends from the inner surface of the lower case 16 toward the cartridge memory 19. The shaft portion 24 extends along the normal direction of the inner surface (that is, a bottom surface 16A2) of the bottom plate 16A of the lower case 16. The bottom surface 16A2 is an example of a "bottom surface" according to the technology of the present disclosure.

The restriction portion 28 into which the cartridge memory 19 can be inserted is provided at the other end of the shaft portion 24. In the example shown in FIG. 9, the restriction portion 28 has a shape in which a lower bottom of a truncated cone is obliquely cut. In the restriction portion 28, an upper bottom portion 28A is located at a distal end of the restriction portion 28, and a lower bottom portion 28B is located on the shaft portion 24 side. The lower bottom portion 28B is inclined with respect to the upper bottom portion 28A.

Here, the diameter of the upper bottom portion 28A is smaller than the diameter of the through-hole 26C. In addition, the diameter of the lower bottom portion 28B is larger than the diameter of the through-hole 26C. In addition, the diameter of the lower bottom portion 28B (here, the diameter as seen from the Z direction shown in FIG. 9) is a diameter that does not cause plastic deformation in the substrate 26. For example, the diameter of the lower bottom portion 28B is larger than the diameter of the through-hole 26C by about 5%.

In addition, in a case where the cartridge memory 19 is seen from a direction along the central axis CL of the shaft portion 24 (that is, the Z direction shown in FIG. 9), the shape of the through-hole 26C is a shape similar to the cross-sectional shape of the shaft portion 24. In the diagram seen from the direction of the central axis CL shown in FIG. 9, the shape of the through-hole 26C is a circular shape, and the cross-sectional shape of the shaft portion 24 is a circular shape having a diameter smaller than the diameter of the through-hole 26C.

In the assembly work of the cartridge memory 19, the cartridge memory 19 is moved toward the shaft portion 24 in the direction along the central axis CL from the shaft portion 24 (that is, downward). After the through-hole 26C passes through the restriction portion 28, the cartridge memory 19 is held at a position determined in advance with respect to the lower case 16. Specifically, the cartridge memory 19 is held between the lower bottom portion 28B of the restriction portion 28 and the inclined mount 20B.

As described above, in the magnetic tape cartridge 10 according to the present modification example, the shaft portion 24 extends along the normal direction of the bottom plate 16A of the case 12. Generally, in a case where the cartridge memory 19 is disposed in the case 12, the cartridge memory 19 is often moved downward from immediately above the lower case 16. For this reason, the shaft portion 24 extends along the normal direction of the bottom surface 16A2 of the lower case 16, so that the assembly work of the cartridge memory 19 is facilitated.

In addition, in the magnetic tape cartridge 10 according to the present modification example, in a case where the cartridge memory 19 is seen from a direction along the central axis CL of the shaft portion 24, the shape of the through-hole 26C is a shape similar to the cross-sectional shape of the shaft portion 24. Even in a case where the direction along the central axis CL of the shaft portion 24 and the normal direction of the substrate 26 of the cartridge memory 19 intersect, the shaft portion 24 can be inserted into the through-hole 26C. With this, the assembly work of the cartridge memory 19 is facilitated.

For example, a case where the through-hole 26C penetrates along the normal direction of the substrate 26, while the shaft portion 24 extends along the normal direction of the bottom plate 16A of the lower case 16 is considered. In this case, in a case where the shaft portion 24 is inserted into the through-hole 26C, since the cross-sectional shape of the shaft portion 24 as seen from the direction along the central axis CL and the shape of the through-hole 26C are not similar, the through-hole 26C is deformed due to the shaft portion 24. For this reason, the assembly work of the cartridge memory 19 becomes difficult. In addition, since an extra load occurs on the substrate 26 of the cartridge memory 19, the durability of the cartridge memory 19 is reduced. In this configuration, since the configuration is made as described above, even in a case where the direction along the central axis CL of the shaft portion 24 and the normal direction of the substrate 26 of the cartridge memory 19 intersect, the shaft portion 24 can be inserted into the through-hole 26C. With this, the assembly work of the cartridge memory 19 is facilitated.

In the above-described embodiment, an example of a form in which the restriction portion 28 has a truncated cone shape has been described, but the technology of the present disclosure is not limited thereto. The shape of the restriction portion 28 is not particularly limited as long as the displacement in the direction in which the cartridge memory 19 comes off the shaft portion 24 can be restricted. For example, the restriction portion 28 may have a conical shape, a spherical shape, or the like.

In addition, in the above-described embodiment, an example of a form in which the lower bottom portion 28B of the restriction portion 28 abuts on the peripheral edge of the through-hole 26C has been described, but the technology of the present disclosure is not limited thereto. For example, an aspect in which the restriction portion 28 has a portion partially protruding from the outer peripheral surface of the shaft portion 24 and the protruding portion abuts on a part of the peripheral edge of the through-hole 26C may be adopted.

In addition, in the above-described embodiment, an example of a form in which the cross-sectional shape of the shaft portion 24 and the shape of the through-hole 26C are circular has been described, but the technology of the present disclosure is not limited thereto. For example, the cross-sectional shape of the shaft portion 24 and the shape of the through-hole 26C may be an elliptical shape or a polygonal shape (for example, a hexagonal shape).

In addition, in the above-described embodiment, an example of a form in which one through-hole 26C is provided in the cartridge memory 19 has been described, but the technology of the present disclosure is not limited thereto. For example, a plurality of through-holes 26C may be provided. In addition, a plurality of shaft portions 24 may be similarly provided.

In addition, in the above-described embodiment, an example of a form in which the shaft portion 24 is a rod-like member extending from the inner wall surface of the case 12 has been described, but the technology of the present disclosure is not limited thereto. For example, one end of the shaft portion 24 may be attached to the inclined surfaces 20A1 and 20B1 of the inclined mounts 20A and 20B.

In addition, in the above-described embodiment, an example of a form in which the restriction portion 28 is integrally molded with the shaft portion 24, but the technology of the present disclosure is not limited thereto. For example, the restriction portion 28 may be a separate component that can be attached to the distal end of the shaft portion 24. In this case, an aspect in which the restriction portion 28 is attached to the distal end of the shaft portion 24 after the shaft portion 24 is inserted into the through-hole 26C may be adopted.

The above-described contents and the illustrated contents are the detailed explanations of the parts according to the technology of the present disclosure, and are merely examples of the technology of the present disclosure. For example, the above explanations related to configurations, functions, actions, and effects are explanations related to examples of configurations, functions, actions, and effects of the parts according to the technology of the present disclosure. Thus, it is needless to say that unnecessary portions may be deleted, new elements may be added, or replaced with respect to the above-described contents and the illustrated contents without departing from the spirit and scope of the technology of the present disclosure. In order to avoid complication and easily understand the part according to the technology of the present disclosure, in the above-described contents and the illustrated contents, the explanation of common general technical knowledge, which is not necessarily particularly required for implementing the technology of the present disclosure, is omitted.

In the present specification, "A and/or B" is synonymous with "at least one of A or B". That is, "A and/or B" may refer to A alone, B alone, or a combination of A and B. In addition, in the present specification, in a case in which the connection of three or more matters is expressed by "and/or", the same concept as "A and/or B" is applied.

In addition, all literatures, patent applications, and technical standards disclosed in the present specification are incorporated in the present specification by reference to the same extent as in a case in which each of the literatures, patent applications, and technical standards is specifically and individually indicated to be incorporated by reference.

Regarding the above-described embodiments, the following is further disclosed.

Supplementary Note 1

A magnetic tape cartridge comprising a noncontact communication medium that is provided in a case and in which a through-hole penetrating a substrate in a plate thickness direction is formed, a shaft portion that is a member having one end provided in the case and that is capable of positioning the noncontact communication medium in the case by being inserted into the through-hole, and a restriction portion that is provided at the other end of the shaft portion and that restricts displacement in a direction in which the noncontact communication medium comes off the shaft portion by abutting on at least a part of a peripheral edge of the through-hole.

Supplementary Note 2

The magnetic tape cartridge according to Supplementary Note 1, in which the restriction portion has a diameter-increased portion having a diameter larger than a diameter of the through-hole, and the diameter-increased portion abuts on the peripheral edge of the through-hole.

Supplementary Note 3

The magnetic tape cartridge according to Supplementary Note 2, in which a diameter of the restriction portion increases from a distal end of the restriction portion toward the diameter-increased portion.

Supplementary Note 4

The magnetic tape cartridge according to Supplementary Note 3, in which a diameter of the distal end of the restriction portion is smaller than the diameter of the through-hole.

Supplementary Note 5

The magnetic tape cartridge according to Supplementary Note 2, in which the restriction portion has a truncated cone shape, and in the truncated cone shape, a lower bottom portion is the diameter-increased portion.

Supplementary Note 6

The magnetic tape cartridge according to any one of Supplementary Notes 1 to 5, in which the noncontact communication medium includes an antenna coil that is formed to go around an outer peripheral edge of the substrate, and the through-hole is formed on an inner peripheral side of the antenna coil.

Supplementary Note 7

The magnetic tape cartridge according to any one of Supplementary Notes 1 to 6, in which the shaft portion extends along a normal direction of the substrate in a state of being positioned in the case.

Supplementary Note 8

The magnetic tape cartridge according to any one of Supplementary Notes 1 to 6, in which the shaft portion extends along a normal direction of a bottom surface of the case.

Supplementary Note 9

The magnetic tape cartridge according to Supplementary Note 8, in which in a case where the noncontact communication medium is seen from a direction along a central axis of the shaft portion, a shape of the through-hole in which the noncontact communication medium is positioned in the case is a shape similar to a cross-sectional shape of the shaft portion.

Supplementary Note 10

The magnetic tape cartridge according to any one of Supplementary Notes 1 to 9, in which the restriction portion is integrally molded with the shaft portion.

Supplementary Note 11

The magnetic tape cartridge according to any one of Supplementary Notes 1 to 10, further comprising a support member that is formed in the case and that supports one surface of the noncontact communication medium in a manner in which the noncontact communication medium is disposed at a predetermined angle with respect to a reference surface of the case, in which the noncontact communication medium is held between the restriction portion and the support member.

What is claimed is:

1. A magnetic tape cartridge comprising:
a noncontact communication medium that is provided in a case and in which a through-hole penetrating a substrate in a plate thickness direction is formed; and
a member having one end provided in the case, a shaft portion that is capable of positioning the noncontact communication medium in the case by being inserted into the through-hole, and a restriction portion that is provided at the other end of the member and that is configured to restrict displacement of the noncontact communication medium in a direction in which the noncontact communication medium comes off the shaft portion by abutting on the noncontact communication medium,
wherein the restriction portion has a diameter-increased portion having a diameter larger than a diameter of the through-hole, and the diameter-increased portion abuts the peripheral edge of the through-hole.

2. The magnetic tape cartridge according to claim 1, wherein a diameter of the restriction portion increases from a distal end of the restriction portion toward the diameter-increased portion.

3. The magnetic tape cartridge according to claim 2, wherein a diameter of the distal end of the restriction portion is smaller than the diameter of the through-hole.

4. The magnetic tape cartridge according to claim 1, wherein the restriction portion has a truncated cone shape, and in the truncated cone shape, a lower bottom portion is the diameter-increased portion.

5. The magnetic tape cartridge according to claim 1, wherein the noncontact communication medium includes an antenna coil that is formed to go around an outer peripheral edge of the substrate, and the through-hole is formed on an inner peripheral side of the antenna coil.

6. The magnetic tape cartridge according to claim 1, wherein the shaft portion extends along a normal direction of the substrate in a state of being positioned in the case.

7. The magnetic tape cartridge according to claim 1, wherein the shaft portion extends along a normal direction of a bottom surface of the case.

8. The magnetic tape cartridge according to claim 7, wherein in a case where the noncontact communication medium is seen from a direction along a central axis of the shaft portion, a shape of the through-hole is substantially the same as a cross-sectional shape of the shaft portion.

9. The magnetic tape cartridge according to claim 1, wherein the restriction portion is integrally molded with the shaft portion.

10. The magnetic tape cartridge according to claim 1, a support member that is formed in the case and that supports one surface of the noncontact communication medium in a manner in which the noncontact communication medium is disposed at a predetermined angle with respect to a reference surface of the case, wherein the noncontact communication medium is held between the restriction portion and the support member.

11. The magnetic tape cartridge according to claim 1, wherein the member is a rod-like member.

12. The magnetic tape cartridge according to claim 1, wherein the restriction portion is configured to abut on at least a part of a peripheral edge of the through-hole.

13. A manufacturing method of a magnetic tape cartridge, comprising:

providing, in a case, a member having one end provided in the case, the member including a shaft portion and a restriction portion provided at another end of the member;

positioning a noncontact communication medium in the case by inserting the shaft portion into a through-hole penetrating a substrate of the noncontact communication medium in a plate thickness direction; and restricting displacement of the noncontact communication medium in a direction in which the noncontact communication medium comes off the shaft portion by causing the restriction portion to abut on the noncontact communication medium, wherein the restriction portion has a diameter-increased portion having a diameter larger than a diameter of the through-hole, and the diameter-increased portion abuts on the peripheral edge of the through-hole.

* * * * *